United States Patent
Masada et al.

(10) Patent No.: US 7,218,653 B2
(45) Date of Patent: May 15, 2007

(54) WAVELENGTH CONVERSION METHOD AND WAVELENGTH CONVERSION ELEMENT

(75) Inventors: Genta Masada, Ibaraki (JP); Hiroyuki Shiraishi, Ibaraki (JP); Ichiro Sekine, Ibaraki (JP)

(73) Assignee: Mitsubishi Materials Corporation, Tokyo (JP)

( * ) Notice: Subject to any disclaimer, the term of this patent is extended or adjusted under 35 U.S.C. 154(b) by 329 days.

(21) Appl. No.: 10/938,772

(22) Filed: Sep. 9, 2004

(65) Prior Publication Data

US 2005/0117199 A1 Jun. 2, 2005

(30) Foreign Application Priority Data

Nov. 27, 2003 (JP) ............................. 2003-397644

(51) Int. Cl.
*H01S 3/10* (2006.01)
*G02F 1/35* (2006.01)

(52) U.S. Cl. ............................ 372/21; 372/22; 372/23; 359/326

(58) Field of Classification Search ............. 372/21–23
See application file for complete search history.

(56) References Cited

U.S. PATENT DOCUMENTS

| | | | | |
|---|---|---|---|---|
| 3,849,667 A | * | 11/1974 | Uematsu et al. | 372/22 |
| 3,858,056 A | * | 12/1974 | Melamed et al. | 359/326 |
| 4,019,159 A | * | 4/1977 | Hon et al. | 359/278 |
| 4,913,533 A | * | 4/1990 | Kafka et al. | 359/328 |
| 5,093,832 A | * | 3/1992 | Bethune et al. | 372/21 |
| 5,164,947 A | * | 11/1992 | Lukas et al. | 372/22 |
| 5,265,115 A | * | 11/1993 | Amano | 372/75 |
| 5,353,292 A | * | 10/1994 | Motegi | 372/21 |
| 5,381,430 A | * | 1/1995 | Nozaki et al. | 372/21 |
| 5,739,947 A | * | 4/1998 | Wood et al. | 359/299 |
| 5,740,190 A | * | 4/1998 | Moulton | 372/23 |
| 5,805,626 A | * | 9/1998 | Komatsu et al. | 372/41 |
| 5,854,802 A | * | 12/1998 | Jin et al. | 372/22 |
| 6,002,697 A | * | 12/1999 | Govorkov et al. | 372/34 |
| 6,125,130 A | * | 9/2000 | Schmitt et al. | 372/31 |
| 6,240,111 B1 | * | 5/2001 | Kubota et al. | 372/21 |
| 6,241,720 B1 | * | 6/2001 | Nighan et al. | 606/3 |

(Continued)

FOREIGN PATENT DOCUMENTS

JP 10-242546 9/1998

(Continued)

OTHER PUBLICATIONS

Suzuki, Yuji O., et al. Extended Abstracts (The 49th Spring Meeting, 2002); The Japan Society of Applied Physics and Related Societies, No. 3, Mar. 27, 2002, Section 30p-ZG-2.

(Continued)

*Primary Examiner*—Minsun Oh Harvey
*Assistant Examiner*—Phillip Nguyen
(74) *Attorney, Agent, or Firm*—Darby & Darby (57) ABSTRACT

An ultraviolet laser is provided that increases the conversion efficiency of laser beams when harmonics having wavelengths of less than 355 nm are generated by converting laser beams with a wavelength conversion element made of a single crystal of lithium tetraborate. A wavelength conversion element is heated and controlled to a specific temperature (for example, 200° C.) within a temperature range of 200 to 450° C. with a predetermined temperature precision.

10 Claims, 8 Drawing Sheets

U.S. PATENT DOCUMENTS

| | | | |
|---|---|---|---|
| 6,287,298 B1* | 9/2001 | Nighan et al. | 606/10 |
| 6,414,784 B1* | 7/2002 | Oosako et al. | 359/326 |
| 6,526,072 B1* | 2/2003 | Sugawara et al. | 372/21 |
| 6,744,547 B2* | 6/2004 | Ikeda et al. | 359/238 |
| 7,110,426 B2* | 9/2006 | Masuda | 372/21 |
| 7,142,354 B2* | 11/2006 | Kojima et al. | 359/326 |
| 2003/0099262 A1* | 5/2003 | Masuda | 372/21 |
| 2003/0198261 A1* | 10/2003 | Masuda | 372/21 |

FOREIGN PATENT DOCUMENTS

| | | |
|---|---|---|
| JP | 2001/053356 | 2/2001 |
| JP | 2002-368293 | 12/2002 |
| JP | 2003-140211 | 5/2003 |
| JP | 2003-195378 | 7/2003 |
| JP | 2003-249695 | 9/2003 |

OTHER PUBLICATIONS

English translation of Suzuki, Yuji O., et al. Extended Abstracts (The 49th Spring Meeting, 2002); The Japan Society of Applied Physics and Related Societies, No. 3, Mar. 27, 2002 Section 30p-ZG-2.

Komatu, R., et al., Extended Abstracts (The 43rd Spring Meeting, 1996); the Japan Society of Applied Physics and Related Societies, No. 3, Mar. 26, 2996, Section 28a-TF-3.

English translation of Komatu, R., et al. Extended Abstracts (The 43rd Spring Meeting, 1996); The Japan Society of Applied Physics and Related Societies, No. 3, Mar. 26, 1996, Section 28a-TF-3.

Japanese Office Action dated Nov. 1, 2006 issued for corresponding Japanese Patent Application No. 2003-397644.

Furusawa, Shin-ichi, et al. "Second Harmonic Generation in $Li_2 B_4 O_7$." Journal of the Physical Society of Japan, Aug. 1991, vol. 60, No. 8, pp. 2691-2693.

* cited by examiner

WAVELENGTH CONVERSION METHOD AND WAVELENGTH CONVERSION ELEMENT

CROSS-REFERENCE

This application claims the benefit of Japanese application no. 2003-397644 filed Nov. 27, 2003. The priority application above is incorporated herein by reference.

BACKGROUND OF THE INVENTION

1. Field of the Invention

The present invention is directed to generating ultraviolet laser beams. More specifically, the present invention relates to a wavelength conversion method for converting wavelengths of laser beams with a wavelength conversion element made of a nonlinear optical crystal and a heating mechanism for heating and controlling the wavelength conversion element to a constant temperature.

2. Description of the Related Art

Recently, in such a wavelength conversion, a method in which a wavelength conversion element made of a single crystal of lithium tetraborate ($Li_2B_4O_7$) having excellent chemical stability and resistance to laser damage is drawing attention. According to this method, based on the principle of second harmonic and the principle of sum frequency, it is possible to obtain various harmonics from different fundamental waves. For example, from the principle of second harmonic, second harmonic waves (green light having a wavelength of 532 nm) of an Nd:YAG laser are made to be incident to the wavelength conversion element such that fourth harmonic waves (ultraviolet light having a wavelength of 266 nm) are generated. Further, from the principle of sum frequency, the fundamental waves and the second harmonic waves of the Nd:YAG laser are made to be incident simultaneously to the wavelength conversion element such that third harmonic waves (ultraviolet light having a wavelength of 355 nm) are generated. Alternatively, the fundamental waves and the fourth harmonic waves of the Nd:YAG laser are made to be incident simultaneously to the wavelength conversion element such that fifth harmonic waves (ultraviolet light of a wavelength of 213 nm) are generated.

Also, since the nonlinear optical constant of the single crystal of lithium tetraborate is a small value of 0.16 pm/V, there is a drawback in that the conversion efficiency of the wavelength conversion is low. Thus, conventionally, incident light is condensed with a lens to generate high output ultraviolet laser such that the low conversion efficiency is compensated.

However, in the case in which the harmonics generated by the wavelength conversion with the wavelength conversion element made of the single crystal of lithium tetraborate have wavelengths of less than 355 nm (fourth and fifth harmonic waves), two-photon absorption of the single crystal of lithium tetraborate is caused, and heat is generated in the wavelength conversion element, which results in changed refractive index of the wavelength conversion element, such that phase matchability lowers. As a result, output loss or unstabilization is caused, and qualities of the laser beams deteriorates, which consequently results in a problem in that it is not suitable for a precise processing such as drilling of a printer board or scribing of various electronic components.

SUMMARY OF THE INVENTION

The present invention is made in consideration of the above problems, and it is an object of the present invention to provide a wavelength conversion method for increasing the conversion efficiency of laser beams and generating harmonics having wavelengths of less than 355 nm such as ultraviolet laser beams suitable for a precise processing.

In the present invention, the inventors have found that a single crystal of lithium tetraborate has a property of a reduced two-photon absorption by heating.

That is, the present invention according to a first aspect provides a wavelength conversion method which includes a step of heating and controlling the wavelength conversion element to maintain the wavelength conversion element at a specific temperature within a temperature range of 200 to 450° C. with a predetermined temperature precision when harmonics having wavelengths of less than 355 nm are generated by converting wavelengths of laser beams with a wavelength conversion element. The wavelength conversion element is made of a single crystal of lithium tetraborate. Further, in the present invention according to a second aspect, the temperature precision of the wavelength conversion element is within ±0.3° C. In addition, in the present invention according to a third aspect, the temperature precision of the wavelength conversion element is within ±0.1° C.

Further, the present invention according to a fourth aspect provides a wavelength conversion device which includes a wavelength conversion element made of a single crystal of lithium tetraborate. When harmonics having wavelengths of less than 355 nm are generated by converting wavelengths of laser beams with the wavelength conversion element, the wavelength conversion element is heated and controlled to a specific temperature within a temperature range of 200 to 450° C. with a predetermined temperature precision. Further, in the present invention according to a fifth aspect, the temperature precision of the wavelength conversion element is within ±0.3° C. In addition, in the present invention according to a sixth aspect, the temperature precision of the wavelength conversion element is within ±0.1° C.

According to such constructions, since the two-photon absorption of the single crystal of lithium tetraborate is reduced by heating the wavelength conversion element, even when the intensity of incident light increases, the transmittance of the laser beams is not lowered much, and heat from the two-photon absorption is suppressed.

Further, the present invention according to a seventh aspect provides a wavelength conversion device for converting wavelengths of laser beams incident to a wavelength conversion element made of a nonlinear optical crystal. The wavelength conversion device includes a heating block for covering an outside surface other than an incident end surface and an emitting end surface of the wavelength conversion element and for heating the wavelength conversion element from outside the wavelength conversion element with a heater, a temperature sensor for detecting a temperature of the heating block, and a temperature control unit for controlling the heating block at a constant temperature based on a detected temperature of the temperature sensor. Here, when a length of the wavelength conversion element is L, a vertical width and a horizontal width of the wavelength conversion element are L/4 or less, and the heating block is projected by L/3 or more in a lengthwise direction from the incident end surface and the emitting end surface of the wavelength conversion element.

Further, the present invention according to an eighth aspect provides a wavelength conversion device for converting wavelengths of laser beams incident to a wavelength conversion element made of a nonlinear optical crystal. The wavelength conversion device includes a heating block for covering an entire surface of the wavelength conversion element and for heating the wavelength conversion element from outside the wavelength conversion element with a heater, a temperature sensor for detecting a temperature of the heating block, and a temperature control unit for controlling the heating block at a constant temperature based on a detected temperature of the temperature sensor. Here, on a surface on an optical axis of an incident side and an emitting side of the heating block, an optical path is formed through which the laser beams pass.

Further, in the present invention according to a ninth aspect, the heating block is a cylindrical structure made of a metallic material, such as copper, having a high thermal conductivity embedded with the heater along the lengthwise direction, ceramics covering an outside of the metallic material, and heat resistant resin covering an outside of the ceramics. In addition, in the present invention according to a tenth aspect, a surface of the metallic material is treated with a heat resistant plating.

According to such constructions, it is possible to heat the wavelength conversion element uniformly and precisely over the lengthwise direction. Thus, it is possible to achieve an efficient and stable conversion of laser beams without temperature distribution in the wavelength conversion element.

As described above, according to the first to sixth aspects of the present invention, since the two-photon absorption of the single crystal of lithium tetraborate is reduced by heating the wavelength conversion element, even when the intensity of incident light increases, the transmittance of the laser beams is not lowered much, and heat due to the two-photon absorption is suppressed. Thus, it is possible to provide a wavelength conversion method for increasing the conversion efficiency of the laser beams and generating harmonics having wavelengths of less than 355 nm, such as ultraviolet laser, suitable for precise processing.

Further, according to the seventh to tenth aspects of the present invention, it is possible to have an wavelength conversion efficiency that is stable over an entire portion of the crystal, without temperature distribution in the wavelength conversion element. Thus, it is possible to perform an efficient wavelength conversion using the wavelength conversion element.

BRIEF DESCRIPTION OF THE DRAWINGS

FIG. 6(a) is a top view and FIG. 6(b) is a side view.

DESCRIPTION OF THE PREFERRED EMBODIMENT

Hereinafter, an embodiment of the present invention will be described with reference to the attached drawings.

In the present embodiment, the block-shaped wavelength conversion element made of a single crystal of lithium tetraborate is heated and controlled such that the temperature of the wavelength conversion element is maintained at a specific temperature within a temperature range of 200 to 450° C. At this time, a temperature precision is set to ±0.3° C. (preferably, ±0.1° C.). For example, if the specific temperature is 300° C., the temperature of the wavelength conversion element is maintained within a range of 299.7 to 300.3° C. (preferably, 299.9 to 300.1° C.). And then, in the state in which the wavelength conversion element is maintained at the specific temperature with a predetermined temperature precision, a second harmonic wave (green light having a wavelength of 532 nm) of an Nd:YAG laser is incident to the wavelength conversion element. In such a manner, when the laser beams of the second harmonic waves pass through the wavelength conversion element, the wavelength is reduced to a half, and fourth harmonic waves (ultraviolet light having a wavelength of 266 nm) are generated and emitted.

When the fourth harmonic waves are generated, the wavelength conversion element is maintained at the specific temperature. Thus, the two-photon absorption of the single crystal of lithium tetraborate constituting the wavelength conversion element is reduced. For this reason, even when an intensity of incident light increases, it becomes difficult for the transmittance of the laser beams to be lowered, and thus it is possible to improve the conversion efficiency of the laser beams. Further, since heat generation caused by the two-photon absorption is suppressed, it is possible to avoid a problem that phase matchability collapses due to a change of a refractive index. Further, it is possible to prevent output loss or instability, and it is possible to maintain the qualities of the laser beams. Therefore, it is possible to perform a precise processing such as drilling of a printed board with the resultant ultraviolet laser.

Moreover, in the above-mentioned embodiment, the case in which the second harmonic waves of the Nd:YAG laser are used as light incident to the wavelength conversion element and the fourth harmonic waves (ultraviolet light having a wavelength of 266 nm) are generated based on the principle of the second harmonics is described. However, the present invention is limited to only generating the harmonics having wavelengths of less than 355 nm, regardless of types of incident light or emitting light (generated light) and the principle of the wavelength conversion. For example, the present invention may be applied to the case in which fundamental waves (wavelength of 1046 nm) and fourth harmonic waves (wavelength of 262 nm) of the Nd:YAG laser are used as incident light and fifth harmonic waves (ultraviolet light having a wavelength of 209 nm) are generated based on sum frequency.

In order to confirm the above-mentioned effect, a wavelength conversion is performed using the fourth harmonic waves (ultraviolet light having a wavelength of 262 nm) of the Nd:YAG laser having repetition rates of 30 kHz and 10 kHz, and the temperature of the wavelength conversion element is varied within a temperature range of 25 to 300°

Figure 1:
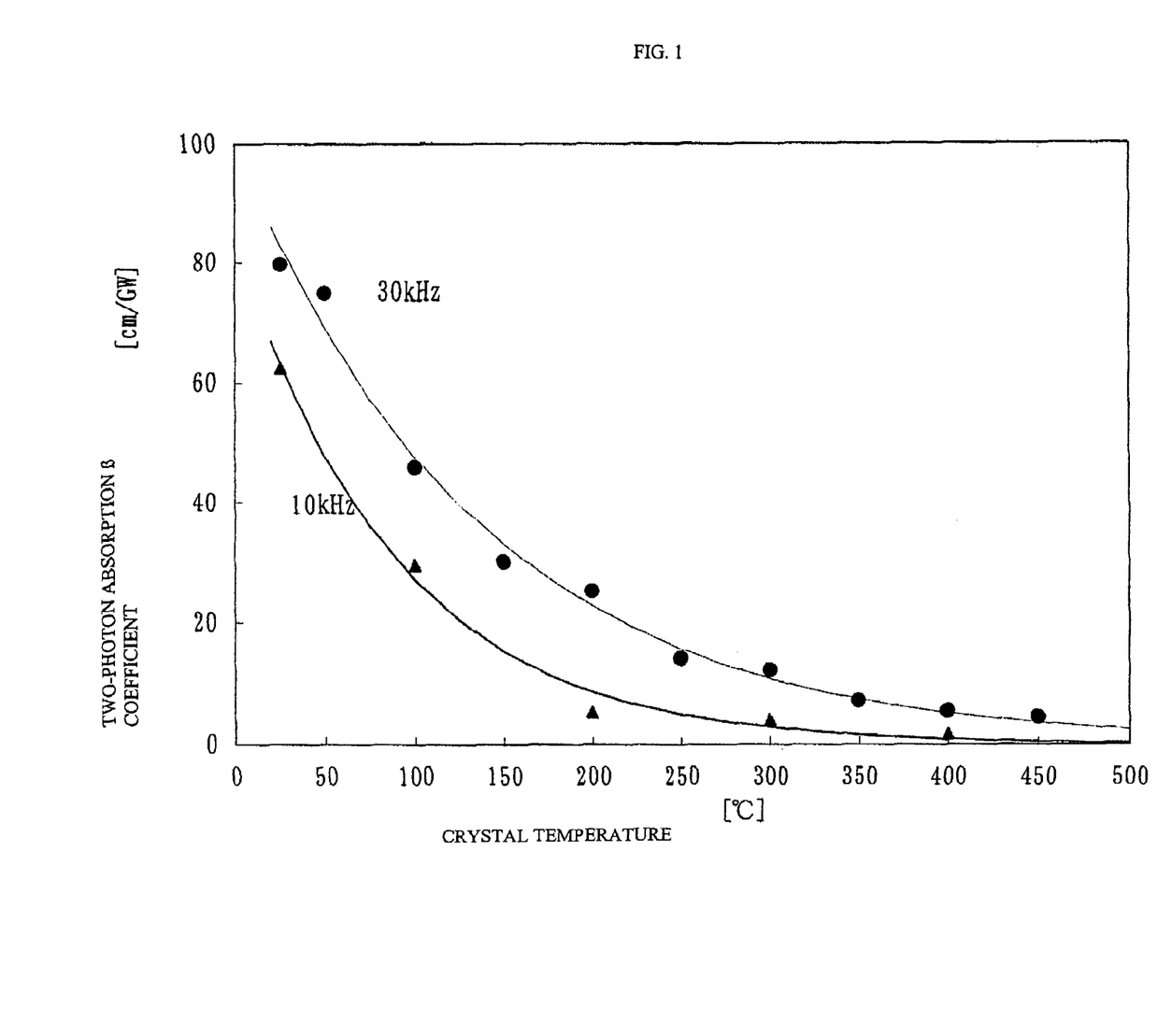
FIG. 1 is a graph showing effects of which the temperature of a wavelength conversion element exerts upon a two-photon absorption coefficient.

C. And then, how the two-photon absorption coefficient β is varied is examined. The result is shown in the graph of FIG. 1. In the graph, a horizontal axis represents the temperature of the wavelength conversion element and a vertical axis the two-photon absorption coefficient β. As being apparent from the graph of FIG. 1, if the wavelength conversion element is heated, the two-photon absorption coefficient β is exponentially lowered. In the temperature range of 200 to 450° C., the two-photon absorption coefficient β is drastically lowered. Further, since two-photon absorption amount is proportional to the two-photon absorption coefficient β, the two-photon absorption amount becomes little drastically.

Figure 2:
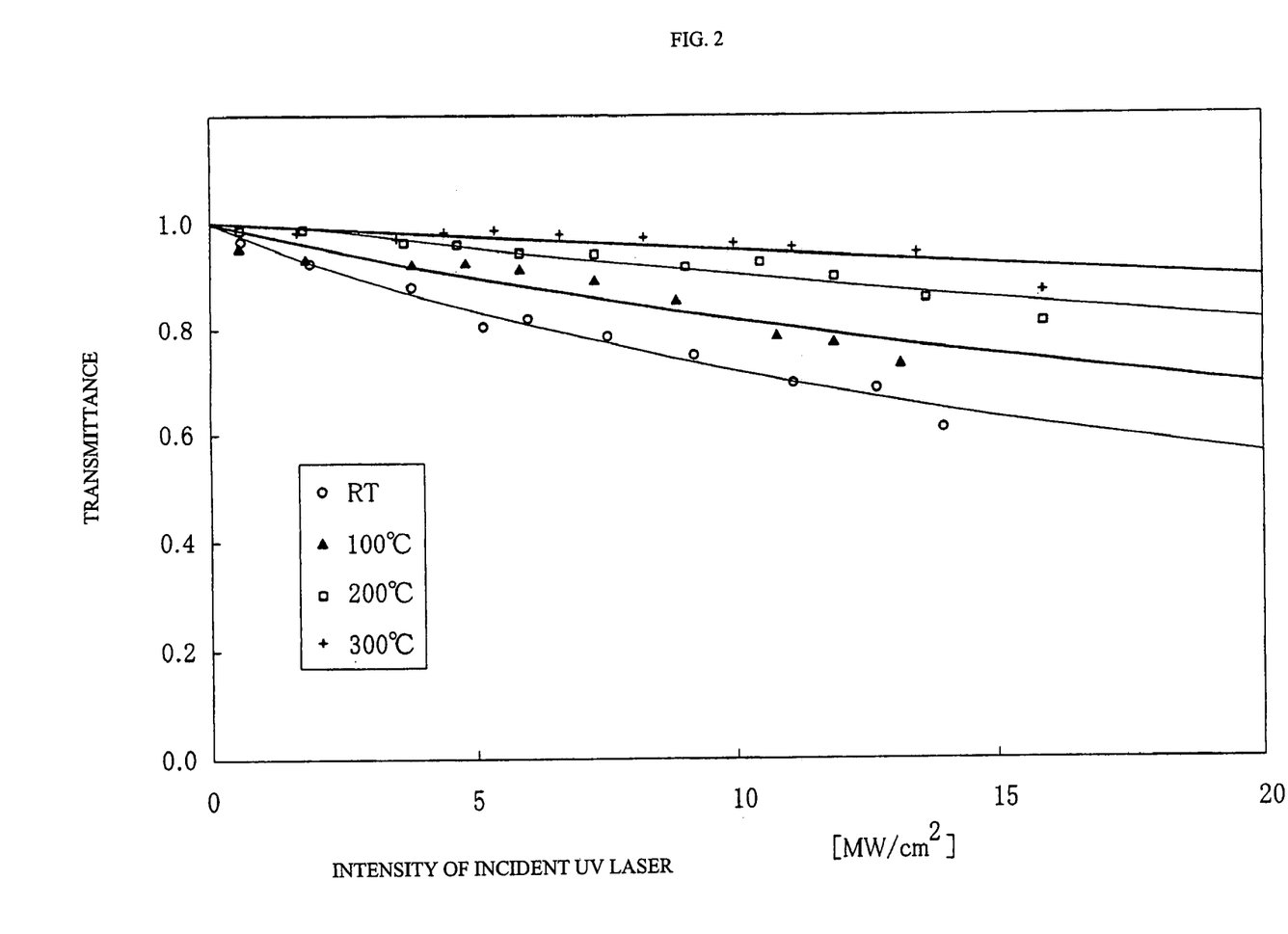
FIG. 2 is a graph showing the relationship of an intensity of incident ultraviolet laser and a transmittance according to the temperature of the wavelength conversion element.

Further, when the temperature of the wavelength conversion element is the room temperature (about 20° C., represented as 'RT' in the graph), 100° C., 200° C. and 300° C., how the transmittance of the laser beams is varied according to a change of the intensity of incident ultraviolet laser is examined. The result is shown in a graph of FIG. 2. In the graph, a horizontal axis represents the intensity of incident ultraviolet laser and a vertical axis represents the transmittance of the laser beams. As being apparent from the graph of FIG. 2, in any temperatures, if the intensity of incident light increases, the transmittance of the laser beams is lowered. In particular, if it is a high temperature of 200° C. or more, it is verified that, even when the intensity of incident light increases, the transmittance of the laser beams is lowered tolerably.

Figure 3:
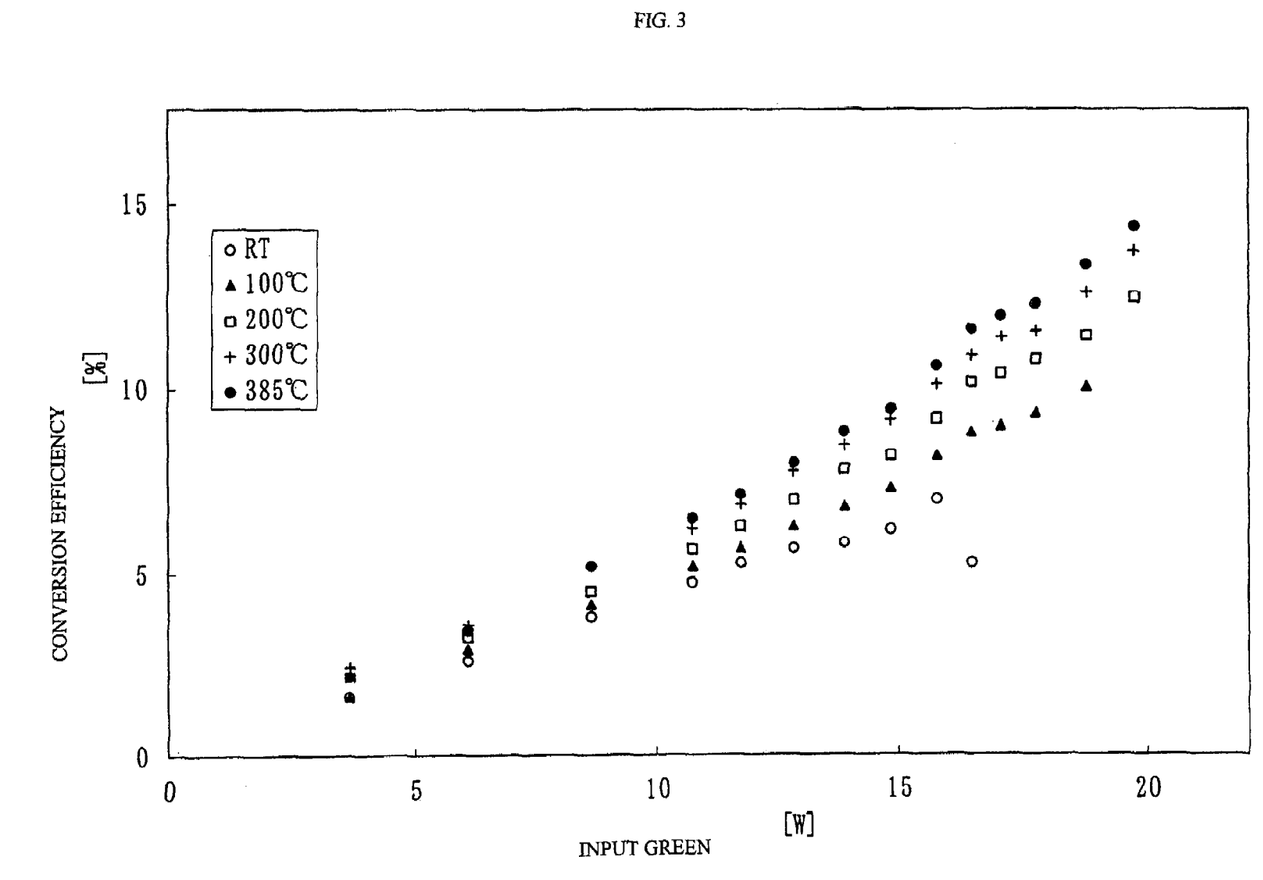
FIG. 3 is a graph showing the relationship of an output of incident light and conversion efficiency according to the temperature of the wavelength conversion element.
Figure 4:
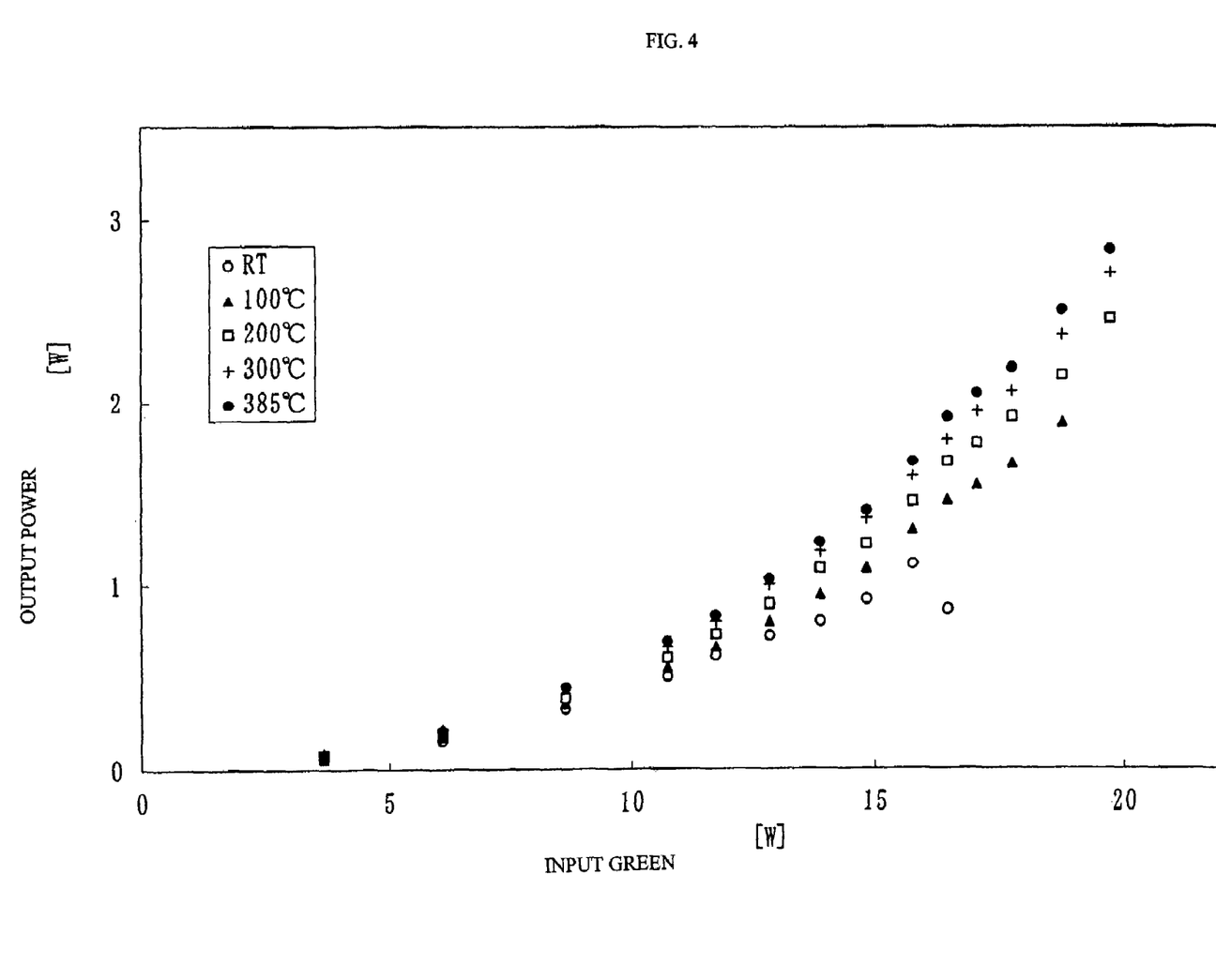
FIG. 4 is a graph showing the relationship of an output of incident light and an output power according to the temperature of the wavelength conversion element.
Figure 5:
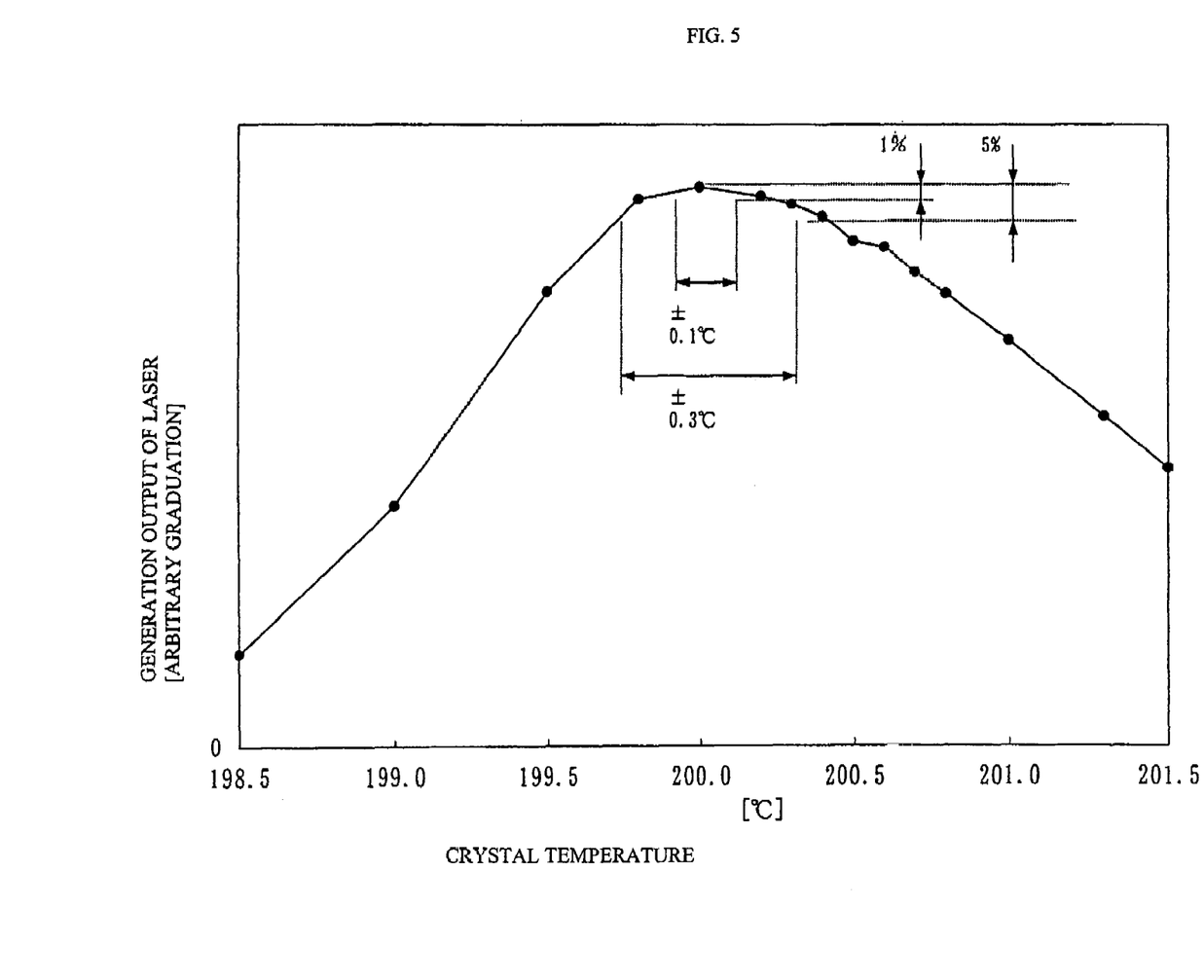
FIG. 5 is a graph showing effect of which the temperature precision of the wavelength conversion element exerts upon a generation output of ultraviolet laser.

In addition, the wavelength conversion is performed using the second harmonic waves (green light having a wavelength of 523 nm) of Nd:YAG laser having an output of 20 W at a repetition rate of 10 kHz, and when the temperature of the wavelength conversion element is the room temperature, room temperature (about 20° C., represented as 'RT' in the graph), 100° C., 200° C., 300° C. and 385° C., how the conversion efficiency or an output power is varied according to a change of the output of incident light is examined. The result is shown in graphs of FIGS. 3 and 4. In the graph of FIG. 3, a horizontal axis represents the output of incident light and a vertical axis represents the conversion efficiency. Meanwhile, in the graph of FIG. 4, a horizontal axis represents the output of incident output and a vertical axis represents the output power. As being apparent from the graphs of FIGS. 3 and 4, in the state in which the wavelength conversion element is not heated, an effect of the two-photon absorption increases and the maximum of the conversion efficiency remains about 7 percent (see FIG. 3). Further, when the output of 1.1 W or more is generated, it becomes unstable (see FIG. 4). To the contrary, if the wavelength conversion element is heated, an effect of the two-photon absorption decreases and at the temperature of 385° C., the conversion efficiency reaches about 15 percent. Further, it is possible to generate the output of about 3 W (see FIG. 4) Further, when the specific temperature of the wavelength conversion element is set to 200° C., a generation output of the ultraviolet laser is measured in the vicinities of the temperature. The result is shown in a graph of FIG. 5. In the graph, a horizontal axis represents the temperature of the wavelength conversion element and a vertical axis represents the generation output of the ultraviolet laser. As being apparent from the graph of FIG. 5, if the temperature of the wavelength conversion element falls in positive and negative directions from the specific temperature (200° C.), the generation output of the ultraviolet laser tends to rapidly decrease. Here, it is verified that if the temperature precision is set within ±0.3° C., the variation of the generation output of the ultraviolet laser is within 5 percent, and if the temperature precision is set within ±0.1° C., the variation of the generation output of the ultraviolet laser is within 1 percent.

Next, an embodiment of a heating mechanism suitable for heating the wavelength conversion element precisely will be described with reference to FIGS. 6 to 9.

Figure 6:
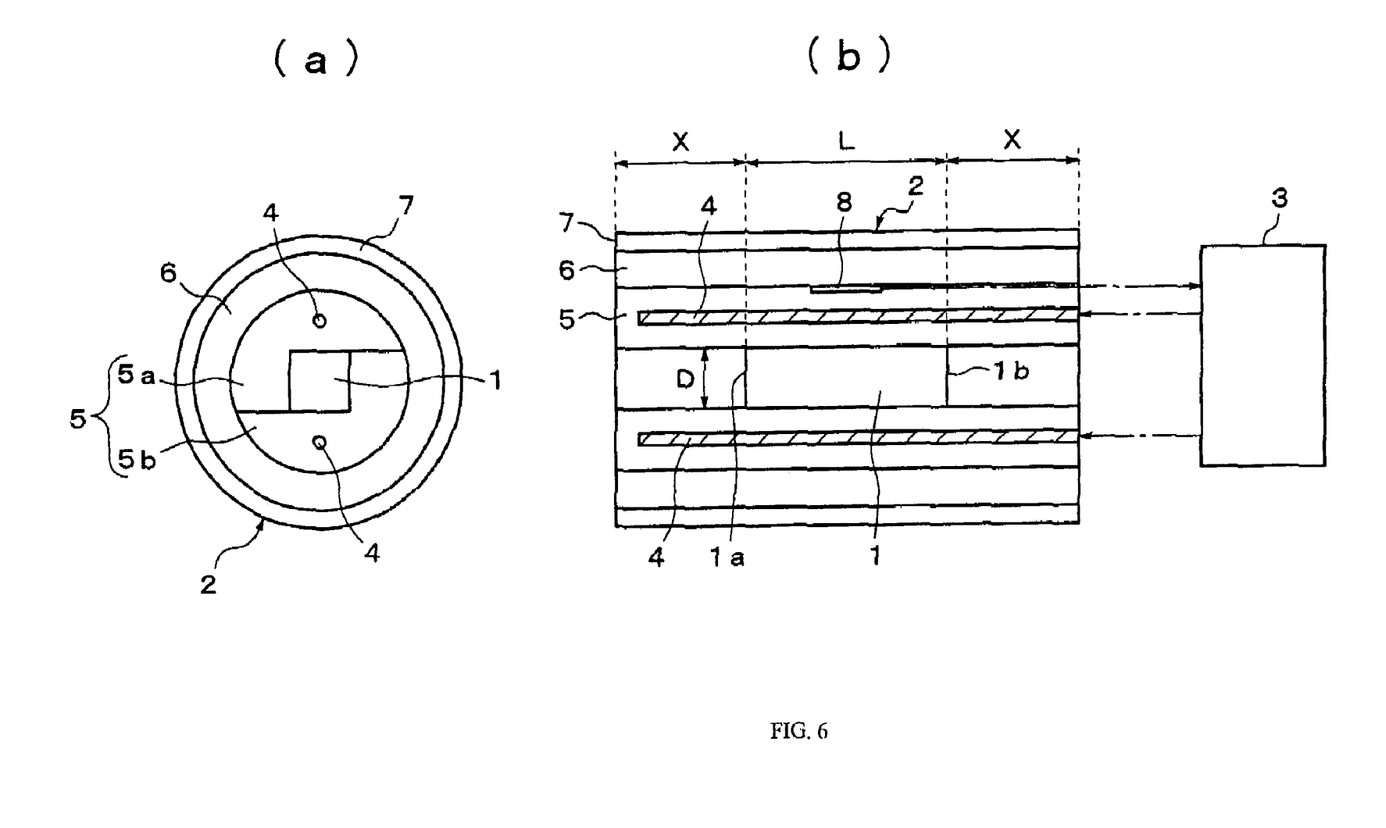
FIG. 6 shows a construction of a wavelength conversion device according to the present invention.

FIG. 6 shows the wavelength conversion device of the present embodiment. The wavelength conversion device includes a wavelength conversion element 1, a heating block 2, and a temperature control unit 3 for heating and controlling the heating block 2 at a constant temperature.

The heating block 2 includes a cylindrical copper material 5 embedded with two ceramic heaters 4 and 4, adiabatic ceramics 6 provided to cover the outside of the copper material 5, and a heat resistant resin material 7, such as Teflon, for covering the outside of the ceramics 6. An angular space portion is provided in a lengthwise direction at a center of the copper material 5, in which the strip-shaped wavelength conversion element 1 (the single crystal of lithium tetraborate) having a square cross-section is housed.

The above-mentioned two ceramics heaters 4 and 4 are arranged at upper and lower positions of the wavelength conversion element 1 along the lengthwise direction, and common terminals of the respective ceramics heaters 4 and 4 are connected to the temperature control unit 3. Further, a temperature sensor 8 is attached to the vicinity of a center in the lengthwise direction of the copper material 5, and the output terminal is connected to the above-mentioned temperature control unit 3. And then, the temperature control unit 3 controls an electrification to the ceramics heater 4 and 4 based on the detected temperature from the temperature sensor 8 such that the heating block 2 becomes a constant temperature.

Further, in the present embodiment, the copper material 5 is an incorporated structure by a pair of half-divided copper materials 5a and 5b each having a L-shaped cross-section. Thus, it is easy to manufacture or incorporate the heating block 2. Further, a heat resistant plating treatment such as a Ni plating treatment on surfaces of the copper materials 5a and 5b is preformed so as to prevent oxidization of the copper material 5, and thus it is possible to prevent dust particles which interfere with the passing of the laser beams from being generated.

By the way, as shown in FIG. 6, the heating block 2 of the present embodiment is constructed such that a dimension in the lengthwise direction is longer than that of the wavelength conversion element 1, and both ends are projected by a constant length from the end surfaces 1a and 1b of the wavelength conversion element 1.

In the wavelength conversion element, if the temperature distribution is generated in the lengthwise direction (that is, a direction of an optical path), a refractive index in the crystal changes, which results in a problem in that the wavelength conversion efficiency is lowered, as described above.

The projections of the heating block 2 are intended for the shut-off from open air. The projections suppress radiation of heat in both end surfaces (the incident end surface 1a and the emitting end surface 1b) of the wavelength conversion element 1 contacting directly open air and make the temperature distribution in the lengthwise direction of the crystal very small. Thus, it is possible to obtain stable wavelength conversion efficiency regardless of the lengthwise direction of the crystal. Further, since an entire length of the wavelength conversion element 1 is used efficiently, it is possible to perform efficient wavelength conversion.

In the present embodiment, in order to confirm the effect by the projections of the heating block 2, the following temperature experiments are performed. At this time, the heating temperature of the wavelength conversion element 1 is set to 400° C.

Figure 8:
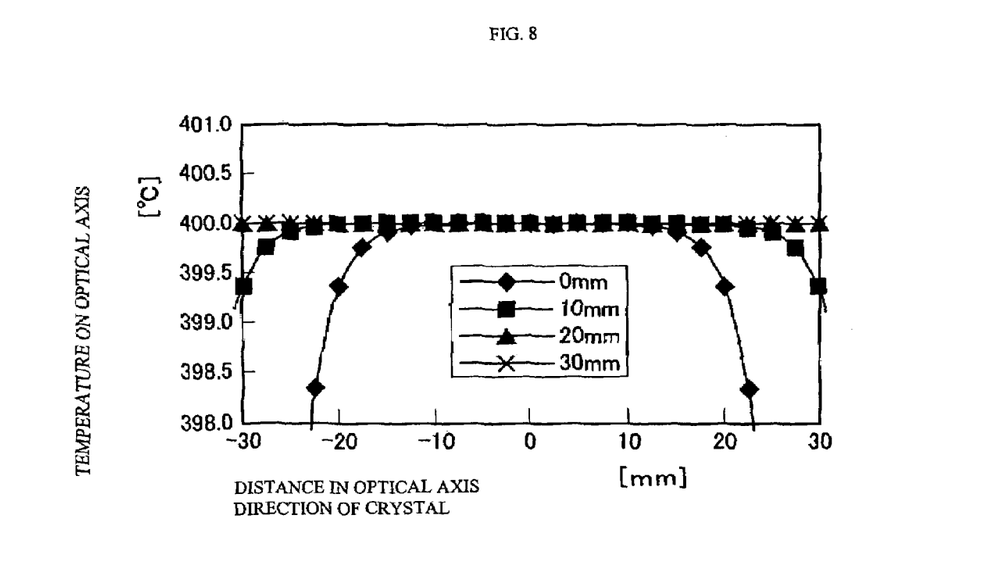
FIG. 8 is a graph showing a temperature distribution of an optical axis of the wavelength conversion element with respect to projection amount of the heating block.

FIG. 8 shows a temperature distribution in the optical axis direction of the crystal with respect to the projection amount (X) of the heating block 2. Here, a horizontal axis represents a distance in the optical axis direction of the crystal (a center in the lengthwise direction of the crystal is set to 0 mm), and a vertical axis represents the temperature.

Moreover, a single crystal of lithium tetraborate having a vertical/horizontal width (D) of 12 mm and a length (L) of 60 mm is used for the wavelength conversion element 1. Further, the copper material 5 of the heating block 2 having a plate thickness of 10 mm is used, and the projection amount from the end surfaces 1a and 1b of the crystal is set to 0 mm (not projected), 10 mm, 20 mm or 30 mm.

As being apparent from FIG. 8, if the projection amount (X) is 10 mm or less, the heat emission in the end surfaces of the crystal becomes remarkable, and the temperature distribution in the optical axis direction in the vicinities of the end surfaces 1a and 1b of the crystal is generated. To the contrary, if the projection amount (X) is set to 20 mm or more, the temperature distribution is not generated. Thus, it is verified that it is possible to heat uniformly over an entire portion in the lengthwise direction of the crystal.

Since the projection amount (X) of 20 mm is ⅓ times than the crystal length (L) of 60 mm, in the present invention, in order to implement a suitable heating mechanism without generating the temperature distribution in the crystal, the projection amount (X) is secured to have a dimension of at least ⅓ times than the crystal length (L).

Figure 9:
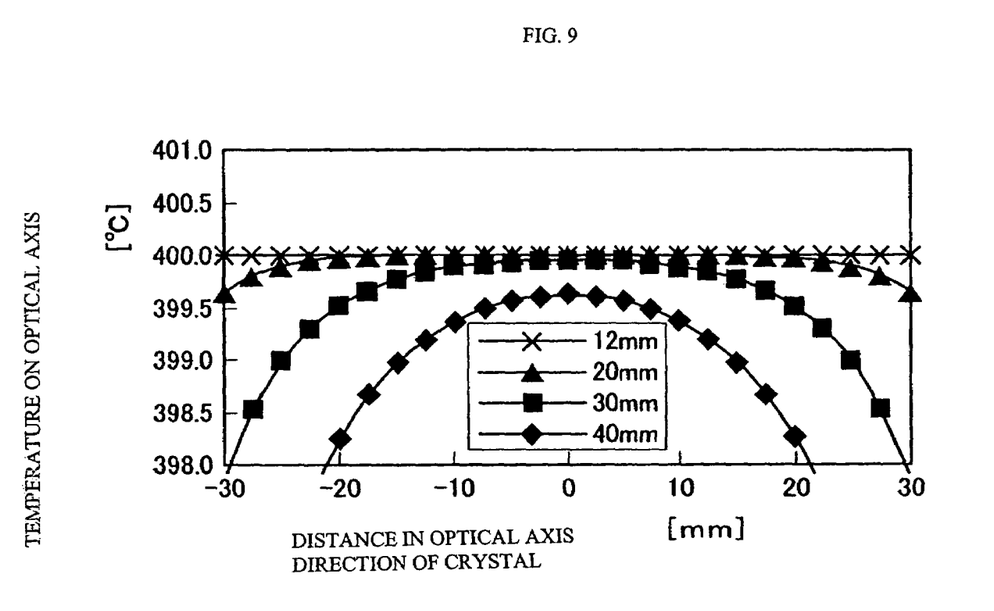
FIG. 9 is a graph showing a temperature distribution of the optical axis with respect to the width of the wavelength conversion element.

Further, FIG. 9 shows a temperature distribution in the optical axis direction with respect to a width (D) of the crystal. Here, a horizontal axis represents a distance in the optical axis direction of the crystal (a center in the lengthwise direction of the crystal is set to 0 mm) and a vertical axis represents the temperature.

Moreover, the copper material 5 having a plate thickness of 10 mm is used, and the projection amount (X) from the end surfaces 1a and 1b of the crystal is set to 20 mm. Further, a single crystal of lithium tetraborate having a length (L) of 60 mm is used for the wavelength conversion element 1, and the vertical/horizontal width (D) is set 12 mm, 20 mm, 30 mm or 40 mm.

As being apparent from FIG. 9, when the vertical/horizontal width (D) is 20 mm, the temperature distribution is generated somewhat in the optical axis direction in the vicinities of the end surfaces of the crystal. If the width (D) is 12 mm or less, it is verified that the temperature distribution is not generated. The generation of the temperature distribution in the width of 20 mm is because an opening area of the end surface side of the wavelength conversion element 1 is overly widened due to an increase of the thickness, the shut-off effect from open air by means of the projections is reduced, and then the end surfaces of the crystal are susceptible to open air.

Since the width (d) of 20 mm is ⅓ times than the crystal length (L) of 60 mm, the temperature distribution in the lengthwise direction of the crystal is not generated. Thus, the vertical/horizontal width is defined to ¼ times or less than the crystal length (L).

By combining the results of FIGS. 8 and 9 as described above, in the present invention, the vertical/horizontal width (D) of the wavelength conversion element 1 is set to ¼ times or less than the crystal length (L), and the heating block 2 is projected by ⅓ times or more than the crystal length from the incident end surface 1a and the emitting end surface 1b of the wavelength conversion element 1 toward the lengthwise direction.

Figure 7:
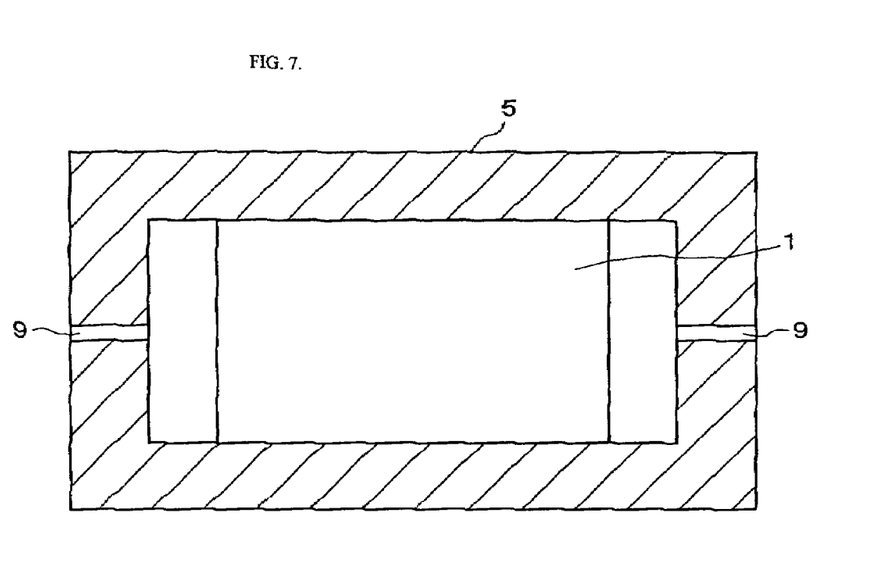
FIG. 7 is a side cross-sectional view showing a structure of a copper material constituting a heating block.

Further, FIG. 7 shows another embodiment of the heating block 2.

In the present embodiment, unlike the embodiment of FIG. 6, an entire portion of the crystal including the incident end surface 1a and the emitting end surface 1b of the wavelength conversion element is covered with the heating block 2, and an optical path through which the laser beam passes is formed on the optical axis of the end surface of the heating block 2 as a hole 9.

Here, it is necessary for the hole 9 to have the smallest size in a range which is possible to adjust an angle of the crystal. In particular, if the size is very small within the range which does not interfere with the proceeding of the laser beam, the hole 9 has an excellent shut-off effect from open air. Further, in the present embodiment, a space is provided between the end surface of the crystal and the end surface of the heating block. However, in the present invention, a structure in which both are close to each other may be applied.

Moreover, FIG. 7 shows only a structure of the copper material 5 constituting the heating block 2. That is, in FIG. 7, the respective adiabatic materials covering the copper material 5, similar to those of FIG. 6, are omitted.

As described above, since the end surface of the crystal also is covered with the heating block 2, it is possible to improve drastically the shut-off from open air. Further, though not shown in the graph of FIG. 7, it is possible to prevent the temperature distribution in the lengthwise direction of the wavelength conversion element 1 from being generated without depending on the projection amount (X) of the heating block 2 or the vertical width and the horizontal width (D) of the crystal.

What is claimed is:

1. A wavelength conversion method comprising the steps of:

providing a heating block for covering an entire outside surface other than an incident end surface and an emitting end surface of the wavelength conversion element and for heating the wavelength conversion element from an outside of the wavelength conversion element with a heater; and heating and controlling a wavelength conversion element to maintain the wavelength conversion element at a specific temperature within a temperature range of 200 to 450° C. with a predetermined temperature precision, wherein said wavelength converting element made of a single crystal of lithium tetraborate is adapted to generate harmonics having wavelengths of less then 355 nm by converting wavelengths of laser beams, and wherein when a length of the wavelength conversion element is L, a vertical width and a horizontal width of the wavelength conversion element are L/4 or less, and the heating block is projected by L/3 or more in a lengthwise direction from the incident end surface and the emitting end surface of the wavelength conversion element.

2. The wavelength conversion method according to claim 1, wherein the temperature precision of the wavelength conversion element is within +/−0.3° C.

3. The wavelength conversion method according to claim 1, wherein the temperature precision of the wavelength conversion element is within +/0.1° C.

4. A wavelength conversion device comprising:

a heating block for covering an entire outside surface other than an incident end surface and an emitting end surface of the wavelength conversion element and for heating the wavelength conversion element from an outside of the wavelength conversion element with a heater; and a wavelength conversion element made of a single crystal of lithium tetraborate, wherein the wavelength conversion element is heated and controlled to a specific temperature within a temperature range of 200 to 450° C. with a predetermined temperature precision when harmonics having wavelengths of less than 355 nm are generated by converting wavelengths of laser beams with the wavelength conversion element, and wherein when a length of the wavelength conversion element is L, a vertical width and a horizontal width of the wavelength conversion element are L/4 or less, and the heating block is projected by L/3 or more in a lengthwise direction from the incident end surface and the emitting end surface of the wavelength conversion element.

5. The wavelength conversion device according to claim 4, wherein the temperature precision of the wavelength conversion element is within +/−0.3° C.

6. The wavelength conversion device according to claim 4, wherein the temperature precision of the wavelength conversion element is within +/−0.1° C.

7. A wavelength conversion device for converting wavelengths of laser beams incident to a wavelength conversion element made of a nonlinear optical crystal, comprising:

a heating block for covering an entire outside surface other than an incident end surface and an emitting end surface of the wavelength conversion element and for heating the wavelength conversion element from an outside of the wavelength conversion element with a heater;

a temperature sensor for detecting a temperature of the heating block; and a temperature control unit for controlling the heating block at a constant temperature based on a detected temperature of the temperature sensor, wherein when a length of the wavelength conversion element is L, a vertical width and a horizontal width of the wavelength conversion element are L/4 or less, and the heating block is projected by L/3 or more in a lengthwise direction from the incident end surface and the emitting end surface of the wavelength conversion element.

8. The wavelength conversion device according to claim 7, wherein the heating block is a cylindrical structure comprising a metallic material of a high thermal conductivity embedded with the heater along the lengthwise direction, ceramics covering an outside of the metallic material, and heat resistant resin covering an outside of the ceramics.

9. The wavelength conversion device according to claim 8, wherein a surface of the metallic material is treated with a heat resistant plating.

10. The wavelength conversion device according to claim 8, wherein the metallic material is copper.

* * * * *